US012808089B2

(12) United States Patent
Conrad et al.

(10) Patent No.: US 12,808,089 B2

(45) Date of Patent: *Nov. 24, 2026

(54) METHOD OF MAKING FINE SPUNBOND FIBER NONWOVEN FABRICS AT HIGH THROUGH-PUTS

(71) Applicant: Kimberly-Clark Worldwide, Inc., Neenah, WI (US)

(72) Inventors: John H. Conrad, Alpharetta, GA (US); Eric E. Lennon, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 193 days.

This patent is subject to a terminal disclaimer.

(21) Appl. No.: 18/621,989

(22) Filed: Mar. 29, 2024

(65) Prior Publication Data

US 2024/0240362 A1 Jul. 18, 2024

Related U.S. Application Data

(63) Continuation of application No. 17/291,338, filed as application No. PCT/US2019/060039 on Nov. 6, 2019, now Pat. No. 12,031,237.

(Continued)

(51) Int. Cl.

| | |
|---|---|
| ***B29C 48/05*** | (2019.01) |
| ***D01D 4/02*** | (2006.01) |
| ***D01D 5/088*** | (2006.01) |
| ***D01D 5/098*** | (2006.01) |
| ***D01D 5/14*** | (2006.01) |

(Continued)

(52) U.S. Cl.

CPC ............ *D01D 5/0985* (2013.01); *D01D 4/02* (2013.01); *D01F 6/06* (2013.01); *D04H 3/007* (2013.01); *D04H 3/02* (2013.01); *D04H 3/14* (2013.01); *B29C 2791/006* (2013.01); *B29D 99/0078* (2013.01); *B29K 2023/04* (2013.01); *B29K 2023/10* (2013.01); *B29K 2023/18* (2013.01);

(Continued)

(58) Field of Classification Search

CPC ............ B29C 48/05; B29C 2791/0006; B29D 99/0078; B29K 2023/04; B29K 2023/10; B29K 2023/18; D01D 5/08; D01D 5/088; D01D 5/098; D01D 5/14; D01D 7/00; D04H 3/007; D04H 3/16; D10B 2321/02; D10B 2321/021; D10B 2321/022

USPC ...... 264/103, 210.8, 211.12, 211.14, 331.17, 264/555; 156/167, 181

See application file for complete search history.

(56) References Cited

U.S. PATENT DOCUMENTS

| | | | |
|---|---|---|---|
| 3,502,763 | A | 3/1970 | Hartmann |
| 3,607,588 | A | 9/1971 | Soehngen |

(Continued)

FOREIGN PATENT DOCUMENTS

| | | | |
|---|---|---|---|
| WO | WO2010087921 | A1 | 8/2010 |
| WO | WO2018160284 | A2 | 9/2018 |

OTHER PUBLICATIONS

Hagewood, John Ph. D., P.E., "Barrier Fabrics of Spunbond Speciality Fibers for Medical Applications", Hillsinc.net, http://www.hillsinc.net/assets/pdfs/barrier-fabrics-spunbound-specialty.pdf. (Undated).

*Primary Examiner* — Leo B Tentoni

(74) *Attorney, Agent, or Firm* — Dority & Manning, P.A.

(57) ABSTRACT

Spunbond fiber nonwoven webs (and methods for making the same) comprising small diameter filaments at high rates of production and with high process stability.

19 Claims, 5 Drawing Sheets

Related U.S. Application Data

(60) Provisional application No. 62/756,313, filed on Nov. 6, 2018.

(51) Int. Cl.

| | |
|---|---|
| ***D01D 7/00*** | (2006.01) |
| ***D01F 6/06*** | (2006.01) |
| ***D04H 3/007*** | (2012.01) |
| ***D04H 3/02*** | (2006.01) |
| ***D04H 3/14*** | (2012.01) |
| ***D04H 3/16*** | (2006.01) |
| *B29D 99/00* | (2010.01) |
| *B29K 23/00* | (2006.01) |

(52) U.S. Cl.
CPC .... *D10B 2321/02* (2013.01); *D10B 2321/021* (2013.01); *D10B 2321/022* (2013.01)

(56) References Cited

U.S. PATENT DOCUMENTS

| | | | | |
|---|---|---|---|---|
| 3,772,417 | A | 11/1973 | Vogt | |
| 4,086,381 | A | 4/1978 | Cheshire et al. | |
| 4,100,324 | A | 7/1978 | Anderson et al. | |
| 5,162,074 | A | 11/1992 | Hills | |
| 5,547,746 | A | 8/1996 | Burton | |
| 5,762,857 | A | 6/1998 | Weng et al. | |
| 5,804,512 | A | 9/1998 | Lickfield et al. | |
| 5,868,984 | A * | 2/1999 | Winter | C08L 23/142 264/210.8 |
| 6,183,684 | B1 | 2/2001 | Lu | |
| 6,274,238 | B1 | 8/2001 | DeLucia | |
| 6,315,114 | B1 | 11/2001 | Keck et al. | |
| 6,936,554 | B1 | 8/2005 | Singer et al. | |
| 6,991,844 | B2 | 1/2006 | LeBoeuf et al. | |
| 7,500,541 | B2 | 3/2009 | Schmidt et al. | |
| 7,659,219 | B2 | 2/2010 | Biran et al. | |
| 8,950,587 | B2 | 2/2015 | Thomson et al. | |
| 9,127,363 | B2 | 9/2015 | David et al. | |
| 9,410,267 | B2 | 8/2016 | Parker et al. | |
| 10,519,570 | B2 * | 12/2019 | Boelaers | D04H 3/007 |
| 2003/0003834 | A1 | 1/2003 | Berrigan et al. | |
| 2003/0056883 | A1 * | 3/2003 | Bansal | D04H 3/16 156/181 |
| 2003/0091617 | A1 | 5/2003 | Mrozinski et al. | |
| 2005/0106982 | A1 | 5/2005 | Berrigan et al. | |
| 2005/0241745 | A1 | 11/2005 | Bansal | |
| 2006/0012072 | A1 * | 1/2006 | Hagewood | D01D 5/082 425/382.2 |
| 2007/0234551 | A1 | 10/2007 | Berrigan et al. | |
| 2009/0264846 | A1 | 10/2009 | Chien et al. | |
| 2012/0237718 | A1 | 9/2012 | Weisman et al. | |
| 2013/0143462 | A1 | 6/2013 | Wood et al. | |
| 2013/0327218 | A1 | 12/2013 | Izzi et al. | |
| 2016/0002825 | A1 | 1/2016 | Cinquemani et al. | |
| 2017/0056257 | A1 | 3/2017 | Nishikawa et al. | |
| 2017/0211217 | A1 * | 7/2017 | Nitschke | D04H 3/16 |
| 2018/0179668 | A1 | 6/2018 | Topolkaraev et al. | |
| 2020/0032437 | A1 * | 1/2020 | Longdon | D04H 3/16 |

* cited by examiner

METHOD OF MAKING FINE SPUNBOND FIBER NONWOVEN FABRICS AT HIGH THROUGH-PUTS

CROSS REFERENCE TO RELATED APPLICATION

This application is a continuation of U.S. Pat. No. 12,031,237, which was filed as U.S. application Ser. No. 17/291,338, having a filing date of May 5, 2021, which is a national stage entry of International Patent Application No. PCT/US2019/060039, having a filing date of Nov. 6, 2019, which claims priority from U.S. provisional Patent Application Ser. No. 62/756,313 filed on 6 Nov. 2018, all of which are herein incorporated by reference.

BACKGROUND

Spunbond nonwoven fabrics comprise bonded webs of continuous filaments formed by extruding a molten thermoplastic polymer from a plurality of fine capillaries as molten filaments. The molten filaments are quenched to at least partially solidify them and then they are attenuated by one or more high velocity air streams which reduce their diameter. In addition to generating relatively fine filaments, the pneumatic drawing of the filaments in the spunbond process also acts to increase the crystallinity of certain polymers, such as propylene polymers, which provides the formed filaments and fabrics with increased tensile strength. By way of example, spunbond filament nonwoven fabrics and processes for making the same are disclosed in U.S. Pat. No. 4,340,563 to Appel et al, U.S. Pat. No. 8,246,898 to Conrad et al. and U.S. Pat. No. 8,333,918 to Lennon et al.

Spunbond filament nonwoven fabrics are commonly used in a wide range of products. The reason for this extensive and varied use in part relates to the ability of spunbond filament nonwoven fabrics to provide a desirable combination of properties including strength, opacity (coverage) and a pleasing hand-feel. Further, the cost of manufacture of spunbond filament fabrics is relatively low as compared to other materials with like properties such as traditional knitted or woven fabrics. As a result, spunbond filament nonwoven fabrics have been found to be particularly useful in relation to the manufacture of single-use or limited-use products; e.g. absorbent personal care products, wipes, protective apparel, geotextiles, tarpaulins, etc.

In order to further improve various properties of the nonwoven fabrics it is often desirable to reduce the average fiber diameter of the spunbond filaments forming the nonwoven fabric. Various measures have been taken to influence and reduce filament diameter. However, forming spunbond filaments having diameters significantly less than about 20 microns has proven difficult without also reducing the overall through-put of the polymer through the system. In this regard, lower polymer through-put rates allows the pneumatic drawing forces to more extensively act upon the extruded filaments and reduce their overall diameter. However, reducing the overall through-put of the system increases the overall cost of the nonwoven fabric. Prior attempts to produce small diameter spunbond filament nonwoven fabrics at high production rates often resulted in fiber breaks, hard spots or other issues that negatively impacted process stability, yields and/or overall web quality. Thus, manufacturers were essentially forced to choose between low filament diameter and high process efficiency.

Therefore, in order to address the continued and unmet needs, the present invention provides an improved process for the production of spunbond filament nonwoven fabrics comprising small diameter filaments at high rates of production and with high process stability.

FIGURES

DESCRIPTION

Figure 1A:
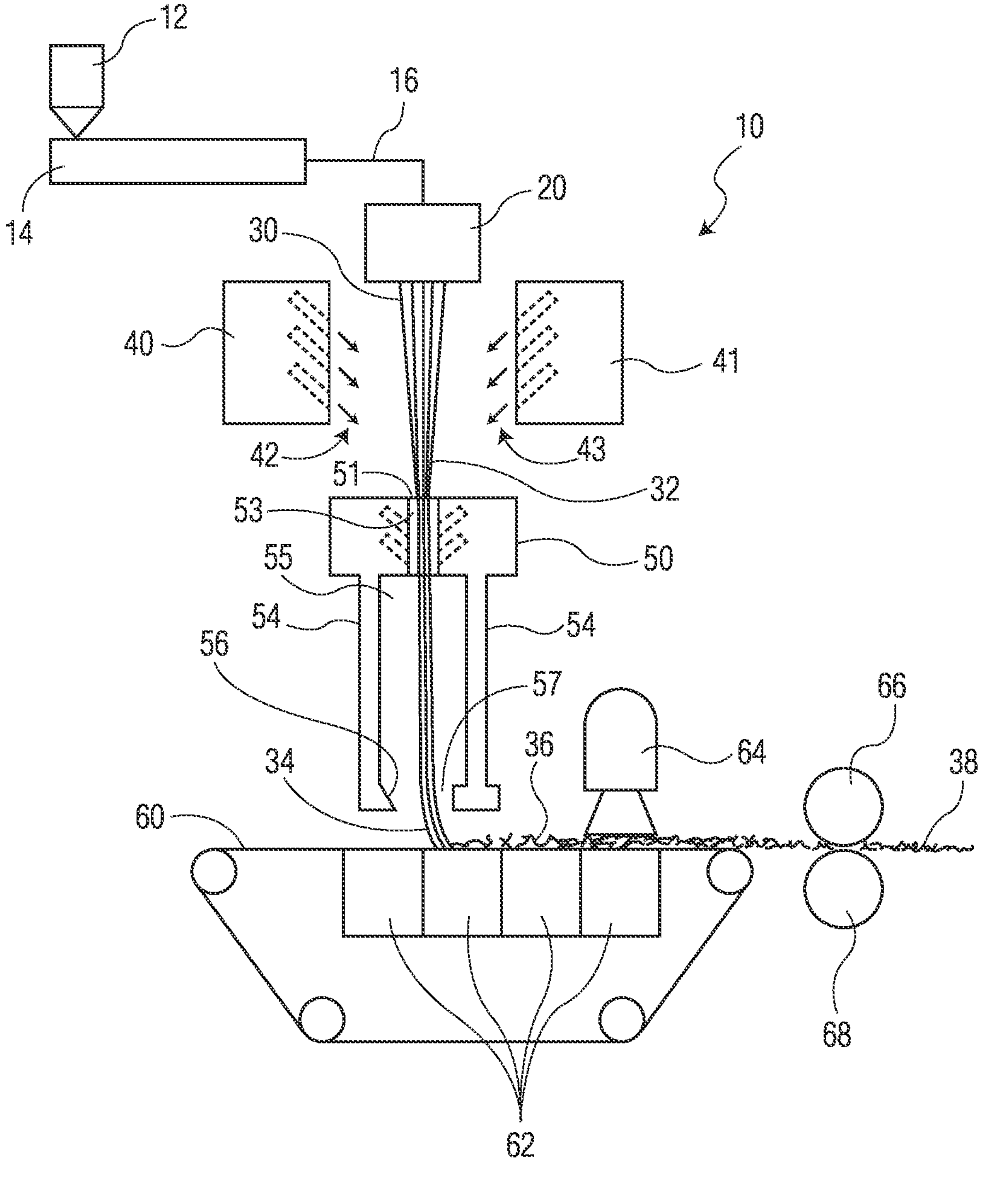
FIGS. 1A and 1B are schematic diagrams of spunbond filament nonwoven fabric manufacturing systems suitable for the production of spunbond filament nonwoven fabrics in accordance with the present invention.

Throughout the specification and claims, discussion of the articles and/or individual components thereof is with the understanding set forth below.

The term “comprising” or “including” or “having” are inclusive or open-ended and do not exclude additional unrecited elements, compositional components, or method steps. Accordingly, the terms “comprising” or “including” or “having” encompass the more restrictive terms “consisting essentially of” and “consisting of.”

As used herein “continuous filaments” means filaments formed in a substantially continuous, uninterrupted manner having indefinite length and having a high aspect ratio (length to diameter) in excess of about 10,000:1.

As used herein, unless expressly indicated otherwise, when used in relation to material compositions, the terms “percent” or “%” refer to the quantity by weight of a component as a percentage of the total.

As used herein, the term “polymer” generally includes but is not limited to, homopolymers, copolymers, such as for example, block, graft, random and alternating copolymers, terpolymers, etc. and blends and modifications thereof. Furthermore, unless otherwise specifically limited, the term “polymer” shall include all possible geometrical configurations of the molecule. These configurations include, but are not limited to isotactic, syndiotactic and random symmetries.

As used herein “ethylene polymer” or “polyethylene” means a polymer having greater than 50 mol. % units derived from ethylene.

As used herein “olefin polymer” or “polyolefin polymer” means a polymer having greater than 50 mol. % units derived from an alkene, including linear, branched or cyclic alkenes.

As used herein “propylene polymer” or “polypropylene” means a polymer having greater than 50 mol. % units derived from propylene.

As used herein, the term “nonwoven” web or fabric means a structure or a web of material that has been formed without use of traditional fabric forming processes such as weaving or knitting, to produce a structure of individual filaments or threads that are entangled or intermeshed, but not in an identifiable, repeating manner.

As used herein, the term “machine direction” or “MD” refers to the direction of travel of the forming surface onto which filaments are deposited during formation of a fibrous web.

As used herein, the term "cross-machine direction" or "CD" refers to the direction which is essentially perpendicular to the machine direction defined above.

As used herein "personal care articles" means any and all articles or products used for personal health or hygiene including diapers, adult incontinence garments, absorbent pants and garments, tampons, feminine pads and liners, bodily wipes (e.g. baby wipes, perineal wipes, hand wipes, etc.), bibs, changing pads, bandages, and components thereof.

As used herein "protection articles" means all articles intended to protect a user or equipment from contact with or exposure to external matter including, for example, face masks, protective gowns and aprons, gloves, caps, shoe covers, equipment covers, sterile wrap (e.g. for medical instruments), car covers, and so forth.

As used herein "melting point" means that determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak. A heating rate of 10° C./minute is used.

Melt-Spinning Process

In reference to FIG. 1A, a system 10 is shown suitable form making nonwoven fabrics formed form melt-extruded, drawn filaments such as for example those commonly referred to as spunbond filament nonwoven fabrics. In one embodiment, the extrudate composition (not shown), typically in the form of pellets, is provided in a hopper 12 and fed into an extruder 14 which melts the polymeric portion of the composition and forms an initial stream of molten polymer. The molten polymer stream is pumped to the spinning assembly 20 via piping 16. While suitable ranges will vary with particular polymers, generally speaking, in order to limit degradation or other undesired effects on the polymers, the molten polymer typically is not heated to a temperature more than about 150° C., 125° C., 100° C. or 85° C. of the melting point. In certain embodiments the polymer may be heated to a temperature between about 30° C. and about 150° C. or between about 45° C. and about 125° C. above of its melting point.

Figure 1B:
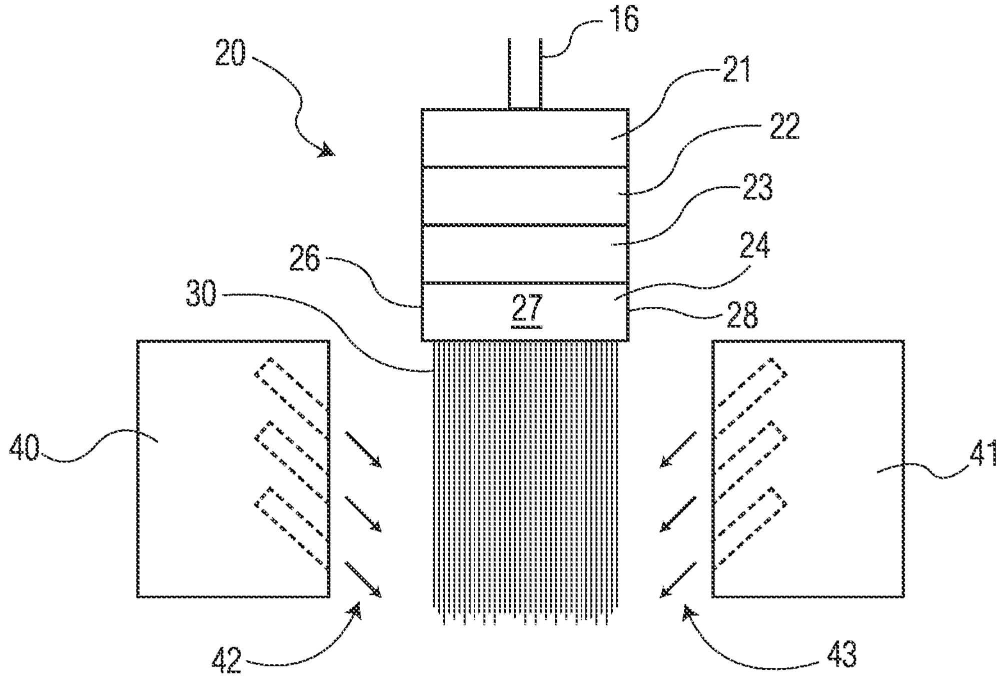

As shown in reference to FIG. 1B, in one embodiment, the spinning assembly 20 can include a distributor 21, screen pack 22, support plate 23 and spinneret 24. The molten stream of polymer can be fed to a distributor 21 which acts to spread the molten polymer across a broader area by directing the molten polymer stream laterally and downwardly towards the spinneret 24. Various suitable distributors are known in the art including T-slot distributors, "coat-hanger" distributors and so forth. By way of example only, various distributors are described in CA2621712 and U.S. Pat. No. 7,179,412 to Wilkie et al. Further, in certain embodiments it may be desirable to employ a distributor that includes a plurality of plates stacked one on top of the other with a pattern of openings arranged to create a plurality of flow paths for directing the polymeric material both sidewardly and downwardly through the distributor. Examples of stacked plate distributors include, but are not limited to, those described in U.S. Pat. No. 5,989,004 to Cook and U.S. Pat. No. 7,104,442 to Haynes et al.

Optionally, albeit highly preferred, below the distributor 21 is a filter or screen 22 and a support member 23. The screen acts to filter impurities or other unwanted debris from the molten streams in order to prevent fowling of the spinneret such as by blocking one or more of the capillaries. Suitable screens may for example comprise one or more stacked screens ranging between about 50-350 mesh. Supporting the screen(s) is a support member 23. Suitable support members may, for example, simply comprise a metal plate having a high number and frequency of apertures extending there through. The pressurized molten polymer stream may be directed from the support plate 23 into the spinneret 24. With respect to the attachment of the various components forming the spinning assembly, in order to form a seal sufficient to withstand the high pressures associated with this process the components within the spinning assembly will have seals rated for the high temperatures and pressures described herein including for example those provided by metal-to-metal seals or high performance gaskets.

Figure 2A:
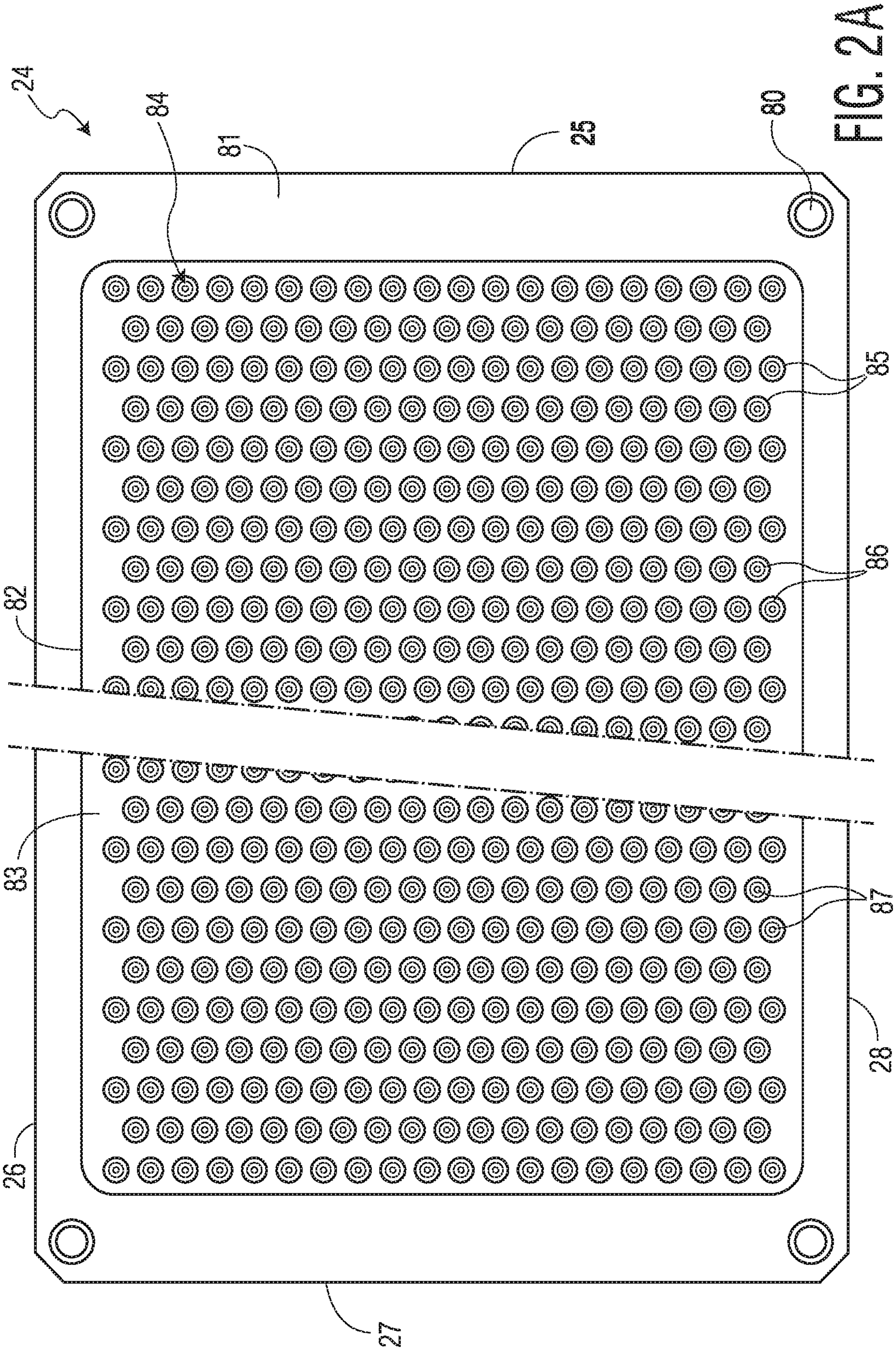
FIG. 2A is a top schematic view of a spinneret suitable for use in the present invention and in particular those descried in FIG. 1.
Figure 2B:
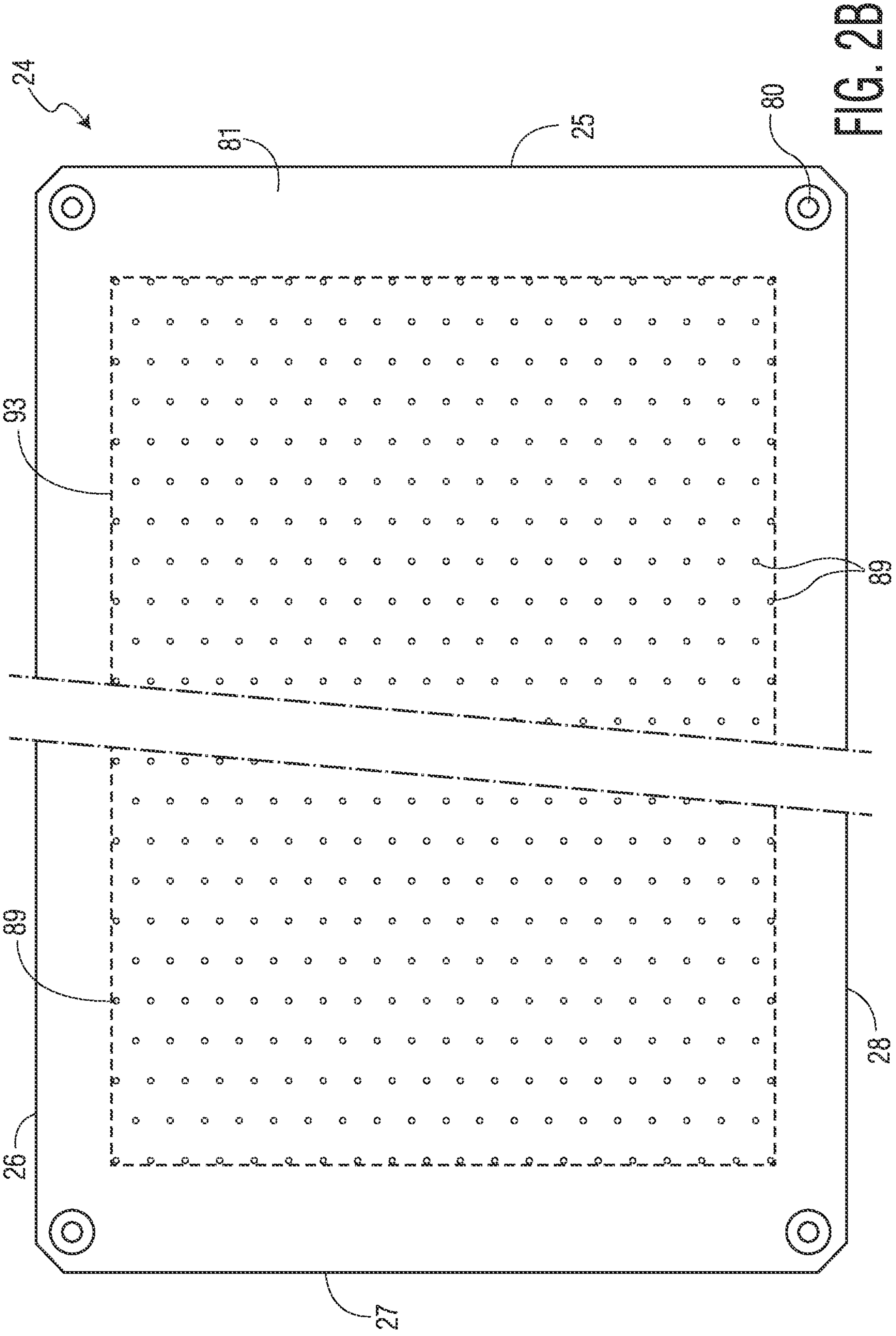
FIG. 2B is a bottom schematic view of the spinneret of FIG. 2A.
Figure 3:
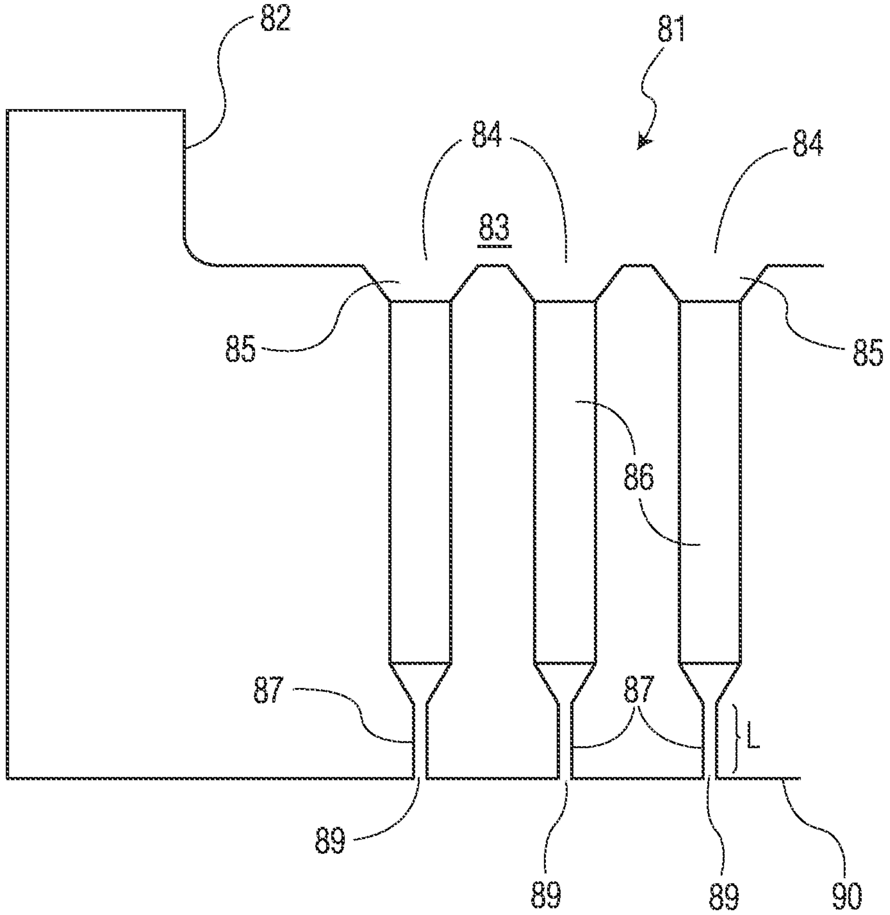
FIG. 3 is a cross-sectional schematic view of a portion of a spinneret suitable for use in connection with the present invention.

As shown in FIGS. 2 and 3, the spinneret 24 will often have, along its outer most perimeter, fasteners such as bolts, welds, brackets, clamps or other means for holding the spinneret adjacent and in fluid communication with the upstream components such as the breaker plate and/or screen. Bolts 80 may be located about the perimeter to secure the spinneret 24 to the other components of the spinning assembly 20. In reference to FIGS. 2A and 3, the perimeter of the upper surface 81 can form a raised edge or lip 82 that defines a depression or trough 83 for receiving the molten polymer. The raised edges or lip 82 of the spinneret 24 forms a high-pressure seal with the lower edges of the support plate 23 to which it is attached.

As best seen in reference to FIG. 3, the spinneret includes a pattern of conduits 84 extending through the thickness of the spinneret 24 wherein the molten polymer flows through the inlet openings 85, and from there through the associated inlet channels or counter bore 86, and then through the capillary 87 and out of the associated exit orifice 89. The capillary 87 terminates at the bottom or lower surface 90 of the spinneret at the exit orifice 89. The capillary includes that section of the conduit extending through the thickness of the spinneret that has the same diameter as the exit orifice. The portion of the conduit above the capillary, such as a counter bore, will have a significantly larger diameter than that of the capillary, e.g. having a diameter at least about 250%, 350% or 450% larger than that of the capillary diameter. The size of the exit orifices and capillary can vary such as for example having a diameter between about 0.2 mm and about 0.45 mm. In certain embodiments, the exit orifice and/or capillary can have a diameter of at least 0.2 mm, 0.23 mm, 0.25 mm, 0.28 mm or 0.29 mm and/or a diameter less than about 0.45 mm, 0.42 mm, and 0.40 mm, 0.39 mm or 0.38 mm. As used herein the diameter, for non-circular orifices, is determined across the longest diameter line of the opening. The length of the capillary (L) extends proportional to the diameter (D) of the exit orifice and the length of the capillary divided by orifice diameter (L/D) will be at least about 4. In certain embodiments, the L/D may be equal to or greater than about 4.0, 4.3, 4.5, 4.7, 5.0, 5.3, 5.5, 5.7, 6.0, 6.3 or 6.5 and/or the L/D may be less than about 10.5, 10.0, 9.7, 9.5, 9.3, 9.0, 8.7, 8.5, 8.3 or 8.0. By way of example, the L/D ratio can be between about 4 and about 10, between about 5 and about 10, between about 6 and about 10, between about 5 and about 9, between about 6 and about 9, or even between about 6 and about 8.

In reference to FIGS. 2A and 2B, the pattern of conduits can vary in numerous respects and in many instances will comprise a series of rows of conduits extending parallel with the CD or lengthwise sides 26, 28 of the spinneret and/or extending parallel with the MD or widthwise sides 25, 27 of the spinneret. Conduits of adjacent rows typically will be off-set slightly from one another. The spinneret 24 includes a pattern of conduits 84 for directing the molten polymer through the spinneret 24 and out of the corresponding exit orifices 89. The spinneret will present an extrusion area, namely an inner area of the spinneret that includes exit orifices. The extrusion area is defined by the outer perimeter of the exit orifices, as measured along tangent lines extending along the outermost alignment of exit openings. In relation to the current embodiment, the extrusion area is defined by a line 93 drawn along the outer edge of the outermost exit orifices. The extrusion area may generally have any one of varied linear or curvilinear shapes including, for example, those generally corresponding to a rectangle, diamond, elongate hexagon, elongate octagon, ellipse, pill shaped (i.e. rod with curved ends) and so forth. In certain embodiments the spinneret may have an extrusion area length, extending along the CD, of at least 50 cm such as, for example, having a CD length between about 50 cm and about 1000 cm, between about 75 cm and about 1000 cm, or between about 100 cm and about 800 cm. In addition, in certain embodiments the spinneret may have an extrusion area width, extending in the MD, of at least about 5 cm such as, for example, having a MD width between about 5 cm and about 40 cm, between about 8 cm and about 40 cm, between about 10 cm and about 35 cm, or between about 10 cm and about 30 cm.

In addition, in certain embodiments the inner or center region of the extrusion area may have less closely spaced exit orifices as compared to regions adjacent the CD edges, proximate the quench air flow. In this regard, the pattern of exit orifices may have a CD extending segment at or proximate the center of the extrusion area that has reduced density of conduits or that is entirely lacking exit orifices. For example, the center region may have a section extending across the CD centerline having an MD width between about 10 and about 60 mm that either lacks any conduits or alternatively that has a significantly reduced capillary density (e.g. a capillary density less than 70%, 60%, 50%, 40% or 30% of the average).

The spinneret will have a relatively high density or close spacing of exit orifices such as for example those having an exit orifice or hole density at least about 3 exit orifices per $cm^2$; the density being measured in relation to the number of exit orifices within the extrusion area. In certain embodiments the spinneret may have an exit orifice density at least about 3.5, 3.7, 4, 4.3, 4.5, 4.7, 5, 5.3, 5.5, 5.7, 6, 6.5, 6.7, 7, 7.3 or 7.5 exit orifices per $cm^2$ and/or no more than about 20, 19.5, 19, 18.7, 18.5, 18.3, 18, 17.7, 17.5, 17.3, 17, 16.7, 16.5, 16.3, 16, 15.7, 15.5, 15.3, 15, 14.7, 14.5, 14.3 or 14 exit orifices per $cm^2$. In a further aspect, the number of exit orifices within the spinneret will be greater than 5000 per meter of the extrusion area length (CD length) and in certain embodiments will be greater than about 6000/M, 6500/M, 7000/M, 7500/M, 8000/M or even 8500/M per meter of the extrusion area length (CD length).

The molten polymer is pumped into and through the spinning assembly and spinneret at high-pressures to achieve the throughputs and exit velocities discussed herein below. The molten polymer is extruded out of the exit orifices 89 at rates of at least about 0.3 g/hole/minute or "g/h/m." To calculate g/h/m, the mass of the extrudate composition pumped through the spinneret over a selected period of time is divided by the number of exit orifices and the selected time. The extrusion rate, in certain embodiments, may be at least about 0.3 g/h/m, 0.33 g/h/m, 0.35 g/h/m, 0.37 g/h/m, 0.4 g/h/m, 0.43 g/h/m or 0.45 g/h/m and/or not more than about 0.6 g/h/m, 0.57 g/h/m, 0.55 g/h/m, 0.53 g/h/m or 0.5 g/h/m. In a further aspect, the molten extrudate is pumped through and out of the spinneret having an exit velocity greater than about 10 feet/minute and in certain embodiments may be at least about 10.3, 10.5, 10.7, 11, 11.3, 11.5, 11.7, 12, 12.3 or 12.5 feet/minute and/or may be not more than about 45, 43, 40, 38, 35, 33, 30, 28, 25 or 23 feet/minute. The exit velocity ($V_e$) of the extrudate at the exit orifices is calculated according to the formula below:

$$V_e = \frac{Mf/E}{\rho A}$$

$M_f$=the mass flow rate of the extrudate (lb./min.)
E=the number of exit orifices
ρ=density of molten extrudate ($lb./ft^3$)
A=the cumulative cross-sectional area of the exit orifices ($ft^2$)

In a further aspect, the temperature of the polymer can be regionally controlled either as it enters the spinning assembly or as it moves through the spinning assembly such that the temperature of the molten polymer extrudate exiting the exit openings proximate the quench air is at a higher temperature relative to the molten polymer extrudate exiting the exit openings within the interior of the spinneret and extrusion region. In reference to the embodiments described herein, molten polymer at a first temperature would be extruded out of the rows of exit openings proximate the CD edge and molten polymer at a second temperature (lower than the first temperature) would be extruded out of rows of exit openings proximate the center of the spinneret and spinning area. In this regard, the quench air will first impact and pass through the outer portions of the bundle and as it does so and cools the molten filaments the quench air will warm prior to striking the inner or centrally located filaments within the bundle. When the outer extruded filaments are at a slightly elevated temperature relative to the inner extruded filaments, this will help improve processing at the conditions described herein and create a more uniform frost line across the total filament bundle.

In reference to FIGS. 1A and 1B, upon extrusion out of the orifices of the spinneret 24, a bundle of molten strands 30 is formed traveling downwardly and away from the spinneret 24. Immediately below the lower surface of the spinneret 24, blowers 40, 41 are provided which direct cooling or quench air 42, 43 into the bundle in order to at least partially solidify the molten strands 30. Various different quench air systems are known in the art and may be used in connection with the present invention. The quench air may be provided from a single blower at a single temperature or may be provided from multiple blowers at different temperatures. For example, a quench system may include a stack of multiple quench air blowers on one or both sides of the bundle, wherein the upper air boxes provide air at different temperatures relative to that provided by quench air boxes located thereunder. The quench air temperature will vary in relation to the properties of the polymers being melt-spun, the extrusion temperature, quench air speed, the filament speed, filament density, and other factors as is known in the art. Generally speaking, quench air is provided at temperatures between about 5-60° C. or about 5-35° C. In addition, the quench air may be provided at speeds between about 30-120 M/minute. Typically the quench air is introduced into the filament bundle at an angle perpendicular to or substantially perpendicular to the direction of the filament flow. However, the quench air may alternatively be directed into the molten filaments at an angle, relative the direction of the filament flow, that is slightly acute or obtuse (i.e. may be directed slightly upwardly or downwardly).

As may be seen in FIG. 1A, the quenched, solidified or substantially solidified filaments 32 are then fed into a filament drawing unit 50 which acts to further attenuate or reduce the diameter of the filaments 30, 32. The filament draw unit 50 has at least two walls 54 defining channels 53, 55 through which high speed air pneumatically draws the filaments 32 downwardly away from the spinneret 24 and towards the forming wire 60. The quenched filaments 32 initially enter the constricted intake opening 51 and are directed through an upper narrow channel 53. The constricted opening is typically one having an MD width that is not more than about 25% of the MD width of the extrusion area. In certain embodiments the constricted opening may have an MD width that is not more than about 20%, 18%, 15%, 12% or 10% of the MD width of the extrusion area and/or an MD width that is not less than about 0.5%, 1%, 2% or 3% of the MD width of the extrusion area. The CD width of the constricted opening may be about the same as the CD length of the extrusion area and in certain embodiments may have a CD length at least about 1%, 2%, 4% or 5% longer than the CD length of the extrusion area. The quenched filaments and the quench air will together enter the constricted opening.

Additional high speed air or 'draw air' may also directed into the fiber draw unit such as being directed into the upper narrow channel 53 via conduits and blowers in fluid communication therewith. In addition, the draw air introduced into the channel(s) of the drawing unit may be introduced at speeds greater than about 50 M/second or 75 M/second. The draw air may be directed into the channel(s) from either one or more sides of the draw unit and at one or more locations vertically within the draw unit. The angle of introduction may be either perpendicular to the direction of the filament flow or at a downward angle.

The fiber draw unit may have additional channels below the initial constricting opening and associated channel. The additional channels below the initial constricted opening and associated channel may be sequentially smaller, wider than the constricted opening or have sections of varying MD width. In reference to the embodiment depicted in FIG. 1A, the lower channel 55 is wider than the narrow upper channel 53 associated with the constricted opening 51. The filaments are drawn through the second lower channel 55 and then out of the draw unit 50 through the exit opening 57. In the embodiment shown, the speed of the air rushing downwardly through the draw unit pulls the fibers downwardly away from the spinneret and towards the forming surface. This downward force on the continuous filaments applies a corresponding drawing or pulling force that is transmitted along the quenched filaments and extruded molten filaments. In closed systems, the pressure differential is also a primary driver of the drawing air and filaments. Adequate drawing distance is required in order to sufficiently draw down the fibers. In this regard, the distance between the bottom surface of the spinneret to the convergence of the bundle at a constricted channel opening above the drawing portion is at least about 90 cm and in certain embodiments may be between about 90 cm and about 300 cm or even between about 100 and about 230 cm. In relation to the embodiment shown in FIG. 1A, the drawing distance extends from the bottom surface 90 of the spinneret 24 to the inlet opening 51 of the narrow channel 53 atop of the fiber draw unit 50.

The pneumatic forces acting upon the filaments are configured to achieve a draw ratio of not more than about 1100 and in certain embodiments may be at least about 250, 280, 300, 330, 350, 380, 400, 430, 450, 480, 500, 530, 550, 580, 600, 630 or 650 and/or not more than about 1100, 1080, 1050, 1030, 1000, 980 or 950. The draw ratio is calculated by dividing the terminal velocity ($V_T$) by the exit velocity ($V_E$ discussed above) as follows:

$$\text{Draw Ratio} = \frac{V_T}{V_E}$$

The terminal velocity is calculated as follows:

$$V_T = \frac{V_E \times A_E}{A_T}$$

Where:

$V_E$=initial velocity as discussed herein above $A_E$=the cross-sectional area of diameter of the exit orifice $A_T$=the cross-sectional area of the resulting filament The entraining air forming the pneumatic forces upon the filaments enters the system from the openings or gaps located between the various components above the drawing unit and the various blowers as noted. However, the filament draw unit will typically employ additional air blowers or other air feeds as is known in the art. The walls 54 of the draw unit 50 may optionally be manipulated inwardly or outwardly in order to modify the size of the channel at different locations within the draw unit. In certain embodiments, the walls 54 may be moved inwardly or outwardly in discrete sections so as to form a channel having varying dimension or widths in order to adjust the drawings forces and spreading of the filaments within the bundle. Still further, in order to improve the uniform spreading and coverage of the formed nonwoven fabric, as is known in the art a deflector plate 56 may be used to spread the filaments. Optionally, electrostatic charge bars (not shown) or other components may further be employed to aid with spreading of filaments, web formation and laydown. While the drawings depict an open air melt-spinning system, it will be readily appreciated that the process of the present invention will also work with closed-air systems as are known in the art. Examples of various quench and drawings systems suitable for use in the present invention include, but are not limited to, those described in U.S. Pat. No. 4,340,563 to Appel et al, U.S. Pat. No. 5,935,512 to Haynes et al., U.S. Pat. No. 6,692,601 Najour et al., U.S. Pat. No. 6,783,722 to Taylor, U.S. Pat. No. 7,037,097 Wilkie et al., U.S. Pat. No. 7,762,800 to Geus et al., U.S. Pat. No. 8,246,898 to Conrad et al., U.S. Pat. No. 8,333,918 to Lennon et al. and US2017/0211217 Nitschke et al.

The fully drawn filaments 34 exit the bottom of the filament drawing unit 50 through the exit opening 57 and are deposited onto a forming surface 60 such as a fabric or wire. As is known in the art, one or more vacuums 62 are positioned beneath the forming surface 60 to draw the filaments on to the forming surface 60 and form a relatively loose matt or web 36 of filaments 34. The vacuums also remove the draw air in order to prevent deflected air from interfering with filament lay-down and/or from disturbing the matt 36 once laid on the wire. The suctioning of the air from underneath the drawing unit can also assist in driving the movement of both the air and fibers through the drawing unit and onto the forming wire.

Optionally, the matt of filaments can be treated in order to impart some minimal degree of integrity required for additional handling. Such treatment may, for example, include consolidating the matt with a compaction roll (not shown) or through the use of a high velocity through-air bonder 64. Such through-air bonders impart only minimal filament-to-filament bonding sufficient for additional handling and processing and without significantly melting the filaments. Such bonders and methods are described in U.S. Pat. No. 5,707,468 to Arnold et al. In addition, in order to achieve relatively higher basis weight fabrics, multiple banks of spinnerets and drawing units may be located sequential over the foraminous forming surface upstream of the consolidating and/or bonding apparatus.

After formation, the nonwoven matt is desirably bonded in order to increase the overall integrity and strength of the same. In one aspect, the matt may be mechanically bonded such as by entanglement. In this regard, the filaments may be entangled by hydroentangling which includes subjecting the matt to one or more rows of fine high-pressure jets of water so that the filaments become sufficiently entangled with one another to form a coherent nonwoven fabric. In other embodiments, the matt may be bonded by one or more techniques known in the art such as by the application of adhesive, pressure, heat and/or ultrasonic energy. In certain aspects, the matt may be pattern bonded, as is known in the art, using a pair of bonding rolls 66, 68, wherein at least one of the rolls has a pattern of protuberances or "pins" corresponding to the desired pattern of bond points to be imparted to the matt and form a bonded nonwoven fabric 38. The two cooperative rolls form a nip through which the matt is passed with the application of pressure and, optionally, heat. While suitable bond elements may be formed without the application of heat, use of heat together with pressure is preferred. The bonding can be conducted as is known in the art employing a nip formed by patterned roll and a smooth anvil roll ("pin-to-flat") or by two coordinated patterned rolls ("pin-to-pin"). With respect to the use of a smooth anvil roll, the roll may be a steel roll or alternatively may be coated with a resilient material. By way of example only, various pattern bonding methods are shown and described in U.S. Pat. No. 3,855,046 to Hansen et al., U.S. Pat. No. 4,333,979 to Sciaraffa et al., U.S. Pat. No. 4,374,888 to Bornslaeger, U.S. Pat. No. 5,110,403 to Ehlert, U.S. Pat. No. 5,858,515 to Stokes et al., U.S. Pat. No. 6,165,298 to Samida et al. and so forth. As is known in the art, the pressures, temperatures, residence time, base sheet composition, basis weight, and other parameters will impact the selection of the desired degree of pressure and/or heat applied to the base sheet to form the bond points. Alternatively, the matt of filaments can be adhesively bonded such by spray, gravure roll or other means for the application of adhesive in the desired pattern as is known in the art.

The resulting nonwoven fabric desirably has high tensile strength, uniform opacity (coverage) and/or pleasing hand. For many applications the bonded nonwoven fabric can have a basis weight less than about 175 $g/m^2$. In certain embodiments, the nonwoven fabrics can have a basis weight less than about 150 $g/m^2$, 120 $g/m^2$, 90 $g/m^2$, 60 $g/m^2$, 45 $g/m^2$, 35 $g/m^2$, 30 $g/m^2$, 25 $g/m^2$, 20 $g/m^2$, or even 18 $g/m^2$ and further, in certain embodiments, can have a basis weight in excess of about 5 $g/m^2$, 8 $g/m^2$, 10 $g/m^2$ or 12 $g/m^2$. Further, the filaments as formed by this process and as provided in the corresponding nonwoven fabric can have an average denier (g/9000M) of less than about 1.5 or less and in certain embodiments may have an average fiber denier equal to or less than about 1.4, 1.3 or 1.2 and/or at least about 0.7, 0.73, 0.75, 0.77, 0.8, 0.83, 0.85, 0.87 or 0.9. Similarly, the filaments as formed by this process and as provided in the corresponding nonwoven fabric can have an average fiber size less than or equal to about 16 microns and in certain embodiments may have an average fiber size equal to or less than about 16, 15.8, 15.5, 15.3, 15, 14.8 or 14.5 u and/or at least about 10, 10.3, 10.5, 10.8, 11, 11.3, 11.5, 11.8 or 12 p.

The extrudate composition, namely that used to make and form the fibers herein, will predominantly comprise one or more thermoplastic olefin polymers. Suitable polyolefins include, but are not limited to, homopolymers, copolymers and terpolymers of ethylene (e.g., low density polyethylene, high density polyethylene, linear low density polyethylene, etc.), propylene (e.g., syndiotactic, atactic, isotactic, etc.), butylene and so forth. In addition, blends and combinations of the foregoing are also suitable for use in connection with the present invention. In one embodiment, for instance, the polymeric portion of the extrudate composition will include greater than about 65 weight percent olyolefin polymer(s) and in certain embodiments the polymer may comprise at least about 65, 70, 75, 80, 85, 90, 95% by wt. olefin polymer and/or less than about 100, 99, 98 or 97 wt. % olefin polymer. By way of non-limiting example, the polymeric portion of the extrudate and formed filaments may comprise between about 65 to about 100 weight percent, between about 70 to about 99 weight percent, between about 80 to about 99 weight percent, between about 70 to 98 weight percent, between about 80 to 98 weight percent or between about 90 to about 99 weight percent. Further, in a particular embodiment, the polymeric portion of the extrudate composition may comprise entirely of olefin polymers such as for example, comprising entirely of polymers selected from the group of propylene, ethylene and butylene polymers. The extrudate composition will have a melt-flow rate (MFR) less than about 60 dg/minute, and in certain embodiments will have an MFR greater than about 5, 8, 10, 12 or 15 dg/minute and/or less than about 55, 53, 50, 48 or 45 dg/minute. Further, as is known in the art, the extrudate composition may optionally include one or more fillers, colorants (e.g. $TiO_2$, pigments), antioxidants, softening agents, surfactants, slip agents and so forth. In particular, as is well known in the art, one or more slip agents, such as fatty acid amides, may be added to the extrudate composition for melt spinning.

In certain embodiments the spunbond filament matts and/or fabrics may, optionally, be treated by various other known techniques such as, for example, stretching, necking, needling, creping, printing, and so forth. In still further embodiments, the coherent nonwoven matts or fabrics may optionally be applied with one or more topical treatments or applications in order to enhance the surface properties of the nonwoven. For example, the nonwoven fabric may be treated with surfactants, detergents, anti-static, sequestrants, plasma fields (e.g. to improve wettability), electric fields (e.g. to form electrets), solvents, anti-microbial agents, pH modifiers, binders, fragrances, inks and so forth.

In addition, spunbond filament nonwoven fabrics of the present invention may be used alone or in connection with a multi-layer laminate. By way of example, the spunbond filament nonwoven fabric (S) may be used in combination with a film (F) to form a S/F, S/F/S, S/S/F/S or other multi-layer laminates. As a further example, the spunbond filament nonwoven fabric (S) may be used in connection with other nonwoven fabrics such as meltblown fiber fabrics (M) to form S/M, S/M/S, S/M/M/S, S/S/M/S or other multi-layer laminates. Various techniques may be utilized to bond the spunbond filament nonwoven fabric together with other layers including hydroentangling, adhesive, thermal, ultrasonic and other forms of bonding. Exemplary composite and/or laminate materials, and various end uses for the spunbond filament nonwoven fabrics include, but are not limited to, those described in U.S. Pat. No. 4,720,415 Vander Wielen, U.S. Pat. No. 5,226,992 Morman, U.S. Pat. No. 5,492,751 to Butt et al., U.S. Pat. No. 5,688,476 Bourne et al., U.S. Pat. No. 5,843,057 McCormack, U.S. Pat. No. 6,115,839 to Covington et al., U.S. Pat. No. 6,534,149 to Daley et al., U.S. Pat. No. 6,811,638 to Close et al., U.S. Pat. No. 7,022,201 Anderson et al., U.S. Pat. No. 7,803,244 Siqueira et al., U.S. Pat. No. 8,603,281 to Welch et al., U.S. Pat. No. 8,914,936 Jemsby et al. and WO98/53896 to Reader.

In one aspect, the nonwoven fabrics may be used as a component of a personal care article either alone or together with other layers or materials. In this regard, the spunbond filament nonwoven fabrics are well suited to serving as a layer intended to come into contact with the skin and/or for layers used for liquid handling. For example, the spunbond filament nonwoven fabrics may comprise part of the liquid intake structure such as comprising a top-sheet, surge material or core wrap. In a further aspect, the spunbond filament nonwoven fabrics may comprise an outer layer of a breathable baffle layer such as is commonly provided by microporous film/spunbond fabric laminates. In still further aspects, the spunbond filament nonwoven fabrics may comprise the outer facing of an elastic component. In this regard, elastic materials, while desirable for their ability to enhance the fit of an article, often have a tacky or otherwise undesirable hand-feel. In a further aspect, the nonwoven fabrics may also be employed as a component of a protection fabric including, for example, use as an outer facing material for elastics or barrier materials. Still further, the spunbond filament nonwoven fabrics may be used as or within a wiper, mop head, wash cloth, geotextile material, filter, housewrap, sound insulation and still other end uses.

It will be appreciated that while the invention has been described in detail with respect to specific embodiments and/or examples thereof, it will be apparent to those skilled in the art that various alterations, modifications and other changes may be made to the invention without departing from the spirit and scope of the same. It is therefore intended that the claims cover or encompass all such modifications, alterations and/or changes.

Tests

Tensile Strength: As used herein "tensile strength" or "strip tensile", is the peak load value, i.e. the maximum force produced by a specimen, when it is pulled to rupture. Samples for tensile strength testing are prepared by drying and then die cutting test specimens to a width of 25 mm and length of approximately 152 mm. The instrument used for measuring tensile strengths is an MTS Criterian 42 and MTS TestWorks™ for Windows Ver. 4 (MTS Systems Corp., Research Triangle Park, NC). The load cell is selected, depending on the strength of the sample being tested, such that the peak load values fall between 10 and 90 percent of the load cell's full scale load. The gauge length is 76 mm and jaw length is 76 mm. The crosshead speed is 305 mm/minute, and the break sensitivity is set at 70% and the slope preset points at 70 and 157 g. The sample is placed in the jaws of the instrument and centered with the longer dimension parallel to the direction of the load application. The test is then started and ends when the specimen breaks. The peak load is determined, for purposes herein, based upon the CD tensile strength. Six (6) representative specimens are tested, and the arithmetic average of all individual specimen tested is the tensile strength for the product.

The average fiber size of the spunbond filaments is determined optically using a calibrated digital microscope with on-screen measurement. The filaments widths (diameter) are selected manually and the digital microscope provides the associated dimension.

The melt flow rate ("MFR") as used herein means that measured in accordance with ASTM D1238-13 using a melt indexer, utilizing condition 230° C./2.16 kg for compositions predominantly comprising propylene polymer(s) and 190° C./2.16 kg for compositions predominantly comprising ethylene polymer(s).

What is claimed is:

1. A method of making spunbond fiber nonwoven fabrics comprising:

providing a spinneret having a length, a width and a thickness and further having a plurality of conduits extending through the thickness of the spinneret, said conduits having an inlet opening in an upper surface of the spinneret and an exit orifice in a lower surface of the spinneret and further having a capillary in fluid communication with said inlet opening and exit orifice, and wherein said exit orifices have an average diameter of between about 0.2 and about 0.45 mm, and wherein the spinneret has at least 5000 exit orifices per meter length of the extrusion area in a cross-direction;

melting an extrudate composition having a polymeric portion and wherein the polymeric portion comprises at least 65% of an olefin polymer;

directing a pressurized molten stream of the extrudate composition into the inlet openings of the spinneret and through the capillaries, extruding said molten stream of the extrudate composition out of said exit orifices at a rate of at least 0.3 g/orifice/minute and forming a bundle of molten filaments;

directing a stream of quench air onto said bundle of molten filaments thereby at least partially solidifying said molten filaments to form a bundle of quenched filaments;

pneumatically drawing said quenched filaments; and suctioning said bundle of drawn filaments onto a foraminous forming surface to form a nonwoven batt, wherein the drawn filaments deposited on the forming surface forming the nonwoven batt have an average fiber diameter of about 15 microns or less.

2. The method of claim 1 wherein extrudate composition is extruded through the exit orifices at an exit velocity of at least about 10.5 feet/minute.

3. The method of claim 1 wherein said capillaries have a diameter the same as the exit openings and have a length extending through the thickness of the spinneret and further wherein the capillary length divided by the exit orifice diameter is greater than about 4.

4. The method of claim 1 wherein the drawing channel has a constricted segment proximate the spinneret and further wherein the distance between the spinneret and said constricted segment of the drawing channel is at least about 90 cm.

5. The method of claim 1 wherein the conduits form an extrusion area within the spinneret and further wherein the extrusion area has a length of at least 50 cm in the cross-direction and a width of at least about 8 cm in the machine-direction.

6. The method of claim 1 wherein the conduits form an extrusion area within the spinneret and further wherein the exit orifices have a density within the extrusion area at least about 3 per $cm^2$.

7. The method of claim 1 wherein the spinneret has at least 6000 exit orifices per meter length of the extrusion area in the cross-direction.

8. The method of claim 1 wherein said polymeric portion of the extrudate composition comprises at least 80% propylene polymer.

9. The method of claim 1 wherein said thermoplastic polymer composition comprises at least 65% ethylene polymer.

10. The method of claim 1 wherein the polymeric portion of the extrudate composition comprises entirely of olefin polymers selected from the group of propylene, ethylene and butylene polymers.

11. The method of claim 1 wherein said capillaries have a diameter the same as the exit orifice and have a length extending through the thickness of the spinneret and further wherein the capillary length divided by the exit orifice diameter is between 5 and 9.

12. The method of claim 1 wherein the filaments are drawn having a draw ratio of less than about 1050.

13. A method of making spunbond fiber nonwoven fabrics comprising:

providing a spinneret having a length, a width and a thickness and further having a plurality of conduits extending through the thickness of the spinneret, said conduits having an inlet opening in an upper surface of the spinneret and an exit orifice in a lower surface of the spinneret and further having a capillary between and in fluid communication with said inlet opening and exit orifice, and wherein said exit orifices have an average diameter of between about 0.2 and about 0.45 mm, and wherein the capillaries have a length, and wherein the capillary length divided by the exit orifice diameter is between 5 and 9;

melting an extrudate composition having a polymeric portion and wherein the polymeric portion comprises at least about 65% of an olefin polymer;

directing a pressurized molten stream of the extrudate composition into the inlet openings of the spinneret and through the capillaries, extruding said molten stream of the extrudate composition out of said exit orifices at a rate of at least about 0.4 g/orifice/minute and forming a bundle of molten filaments;

directing a stream of quench air onto said bundle of molten filaments thereby at least partially solidifying said molten filaments to form a bundle of quenched filaments;

pneumatically drawing said quenched filaments downwardly through a drawing channel and forming a bundle of drawn filaments, said drawing channel having an upper opening and lower opening;

providing a foraminous forming surface below the lower opening of the drawing channel and suctioning air exiting from the lower opening of the drawing channel through said forming surface;

suctioning said bundle of drawn filaments onto the foraminous forming surface to form a nonwoven batt, wherein the drawn filaments deposited on the forming surface forming the nonwoven batt have an average fiber diameter less than about 16 microns; and bonding said nonwoven batt thereby forming a nonwoven fabric.

14. The method of claim 13 wherein the drawing channel has a constricted segment proximate the spinneret and further wherein the distance between the spinneret and said constricted segment of the drawing channel is at least about 90 cm.

15. The method of claim 13 wherein the conduits form an extrusion area within the spinneret and further wherein the extrusion area has a length of at least about 50 cm in a cross-direction and a width of at least about 8 cm in the machine-direction.

16. The method of claim 13 wherein the conduits form an extrusion area within the spinneret and further wherein the exit orifices have a density greater than about 5 per $cm^2$ within the extrusion area.

17. The method of claim 16 wherein the spinneret has an exit orifice density in the extrusion area of between about 5 and about 20 per $cm^2$.

18. The method of claim 16 wherein the spinneret has at least 5000 exit orifices per meter length of the extrusion area in a cross-direction.

19. The method of claim 13 wherein said polymeric portion of the extrudate composition comprises at least 95% of propylene polymer.

* * * * *